T. I. DUFFY.
DISK WHEEL FOR VEHICLES.
APPLICATION FILED NOV. 15, 1919.
1,365,896.
Patented Jan. 18, 1921.
2 SHEETS—SHEET 2.
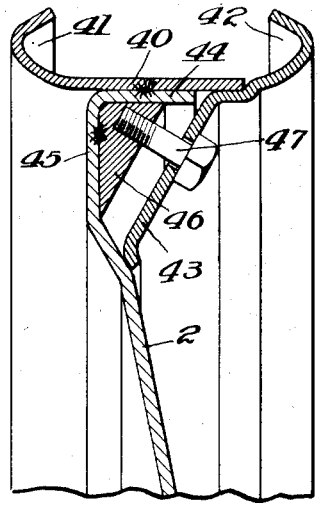
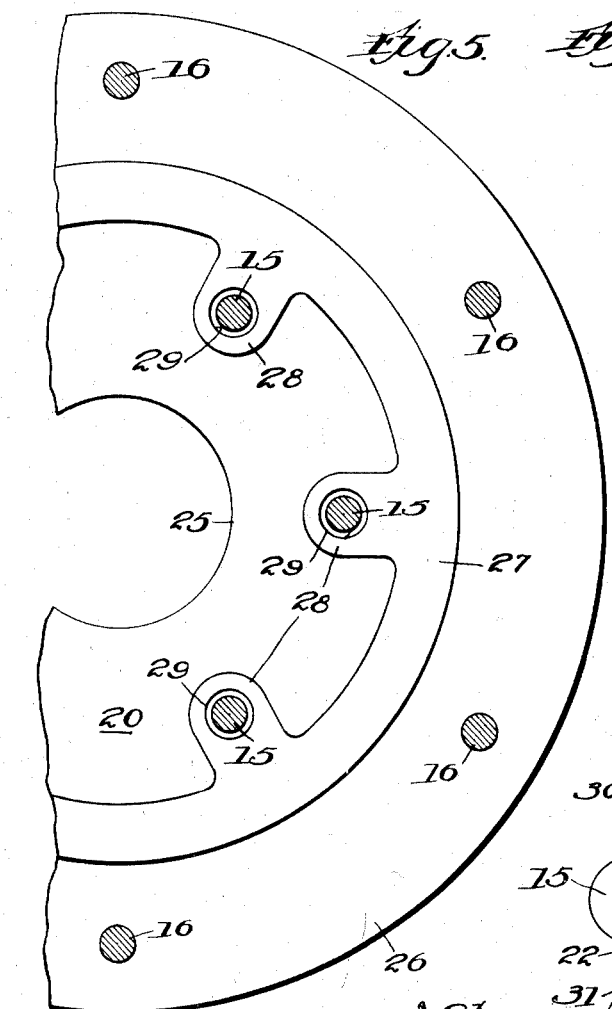
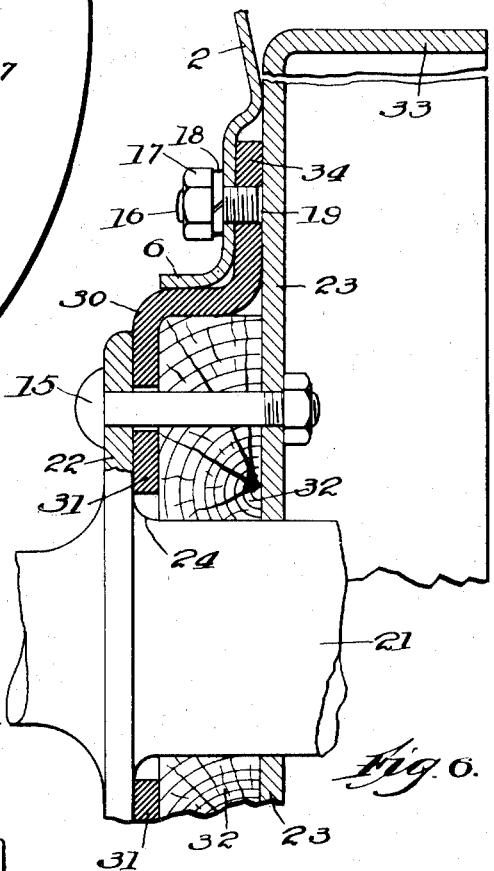
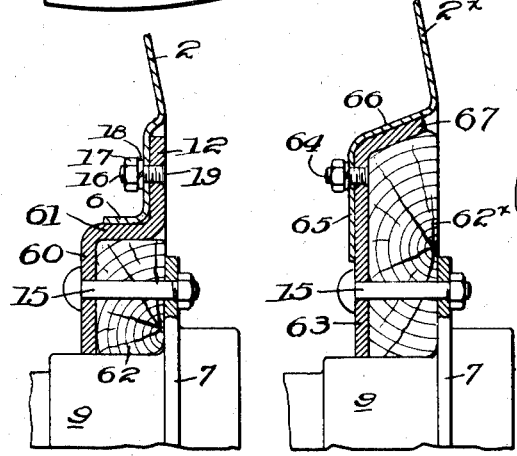
Inventor,
Thomas I. Duffy,
by Burton & Burton
his Attys.

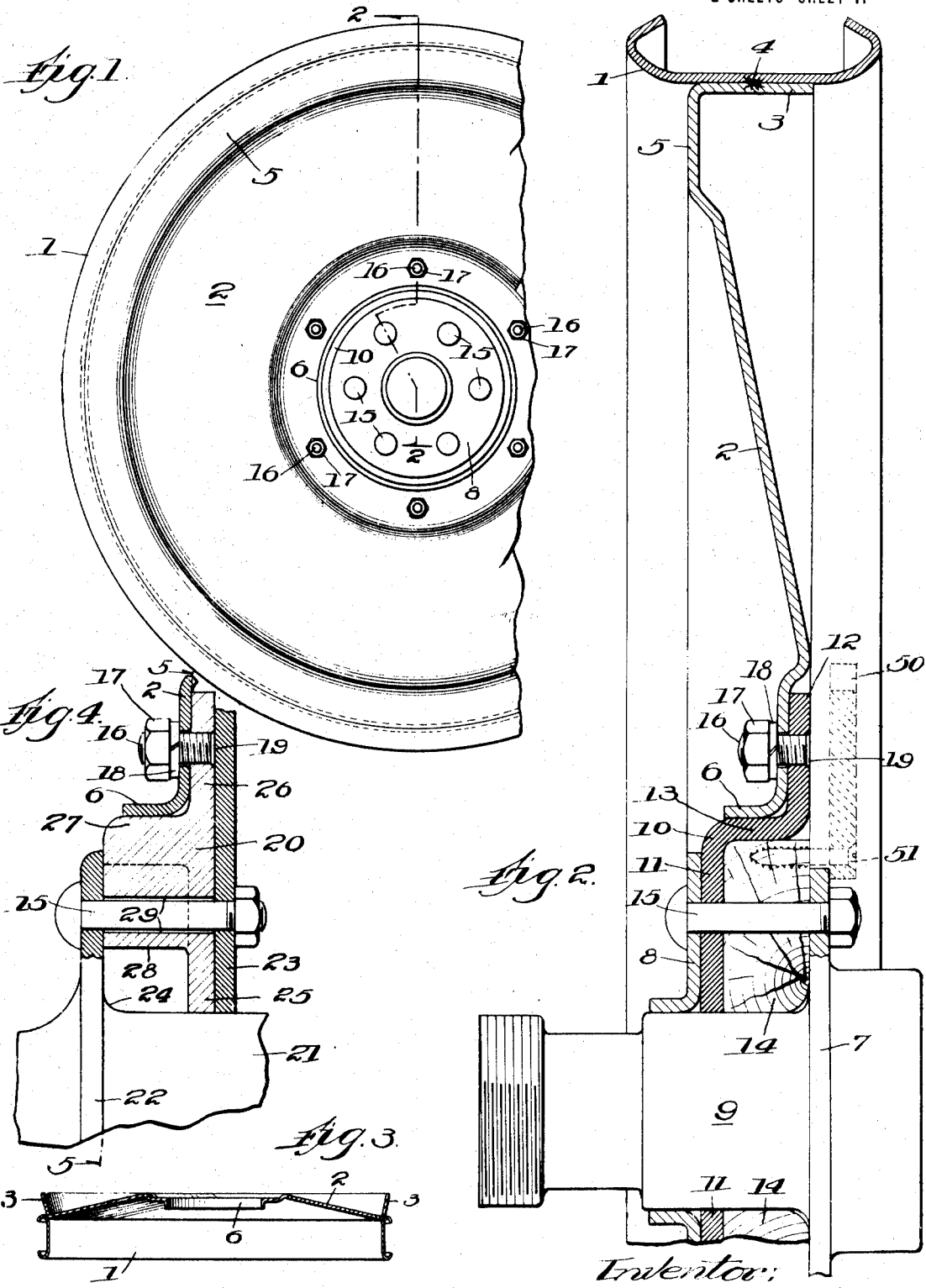

UNITED STATES PATENT OFFICE.

THOMAS I. DUFFY, OF CHICAGO, ILLINOIS, ASSIGNOR, BY DIRECT AND MESNE ASSIGNMENTS, TO NELS GROSS, OF CHICAGO, ILLINOIS.

DISK-WHEEL FOR VEHICLES.

1,365,896.   Specification of Letters Patent.   Patented Jan. 18, 1921.

Application filed November 15, 1919. Serial No. 338,335.

*To all whom it may concern:*

Be it known that I, THOMAS I. DUFFY, a citizen of the United States, residing at Chicago, in the county of Cook and State of Illinois, have invented certain new and useful improvements in Disk-Wheels for Vehicles, of which the following is a specification, reference being had to the accompanying drawings, forming a part thereof.

The purpose of this invention is to provide a disk wheel for vehicles which shall be economical to manufacture and so designed that it can be readily substituted for existing wooden wheels, utilizing the original hubs and hub flanges without alteration. It consists in the features and elements of construction and their combination hereinafter described and shown in the drawings as indicated by the claims.

In the drawings:

Figure 1 is a partial side elevation of a disk wheel embodying this invention.

Fig. 2 is a radial section on a larger scale taken as indicated at line, 2—2, on Fig. 1.

Fig. 3 is a diametral section of the rim and disk of the wheel indicating their relation before assembling.

Fig. 4 is a partial radial section taken similarly to Fig. 2 but illustrating a modified form.

Fig. 5 is a partial transaxial section illustrating the mounting member shown in Fig. 4.

Fig. 6 is a partial radial section showing another modified form of the invention.

Fig. 7 is a partial radial section taken in the vicinity of the rim of the wheel showing a two-part separable rim as applied to a wheel of this type.

Figs. 8 and 9 are views similar to Fig. 6, showing other modifications.

The wheel embodying this invention comprises a rim, 1, which may be a one-piece channeled member as shown in Fig. 2, and directly within said rim a web in the form of a metallic disk, 2, formed with a peripheral flange, 3, by which it is permanently secured to the rim, 1, either by riveting, bolting or by spot-welding, as indicated at 4 on Fig. 2. Principally for the sake of appearance, the disk, 2, has a portion, 5, immediately adjacent its flange, 3, and substantially perpendicular thereto, giving somewhat the appearance of the usual felly of the conventional artillery wheel. Extending inwardly from this annular portion, 5, the disk, 2, is dished and is formed with a central aperture encircled by a flange, 6.

As one of the objects of this invention is to adapt a disk wheel of this type to be substituted for the original spokes and rim of a wooden wheel without alteration of the original hub or hub flanges, the aperture within the flange, 6, of the disk, 2, is made larger than either the integral flange, 7, or the slip flange, 8, of the hub, 9, and the disk is carried on the hub by means of a mounting member, 10. As shown in Fig. 2 the mounting member is formed of rather heavy sheet metal and comprises an inner annular portion, 11, and an outer annular portion, 12, offset from each other by approximately the width of the original wheel spokes normally clamped between the hub flanges, 7 and 8. These annular portions, 11 and 12, are connected by a flange, 13, which forms a seat for the wheel disk, 2, fitting snugly within the flange, 6, thereof. The inner annular portion, 11, of the mounting member, 10, is centrally apertured to fit snugly upon the cylindrical portion of the hub, 9, and a filler ring, 14, which may be of wood, as shown, is fitted snugly within the flange portion, 13, of the mounting member and bored out to the size of the central aperture in the annular part, 11, so as to fit snugly on hub, 9, and space apart the hub flanges, 7 and 8, by substantially the same distance as they would be spaced apart by the original spokes. The part, 11, and filler ring, 14, are both apertured to accommodate the clamping bolts, 15, connecting hub flanges, 7 and 8, and the wheel disk, 2, is removably secured to the mounting member, 10, by a plurality of threaded studs, 16, set in the outer annular portion, 12, and projecting toward the outer face of the wheel,—that is, the side of the wheel away from the vehicle. The studs, 16, are provided with nuts, 17, and lock washers, 18, and preferably the studs themselves are permanently fixed in the mounting member by riveting over at the back side thereof, as indicated at 19 on Fig. 2.

With this construction it will be seen that removal of the wheel consisting of the rim, 1, and disk, 2, may be readily accomplished by merely removing the nuts, 17, and washers 18, without at all disturbing the securement of the mounting member, 10, between the hub flanges or removing such ornamental cap (not shown) as may be provided as a terminal member at the outer end of the hub. Such hub caps are usually designed to be distinctive of the make of vehicle and thus represent considerable advertising value, but since the hub cap never exceeds in diameter the hub flanges by which the original wooden spokes are carried, it is evident that wooden wheels may be converted into disk wheels in accordance with this invention without alteration of the original hub and without sacrificing the original identifying hub cap. In the event of a punctured tire the disk, 2, and rim, 1, carrying the tire can be readily removed and replaced with a spare wheel of like construction and carrying a perfect tire with very little delay.

To insure a close fitting, strong joint between the web disk, 2, and the rim, 1, the disk which is of sheet metal pressed into shape may be initially formed with its flange, 3, somewhat flaring as shown in Fig. 3 so that entry of the disk into the rim, 1, by the application of sufficient force causes the flange, 3, to be bent up rather more sharply from the web and may also cause some stretching of the rim, 1, though such stretching is preferably entirely within the limits of elasticity so that the parts be resiliently held in close contact in addition to their permanent securement by welding or otherwise, as already suggested.

Fig. 4 illustrates a modified form of mounting member 20, which would preferably be made as a casting of metal, and would thus include the filler or spacing member as a unitary part of its structure. In Fig. 4 this form of mounting member is shown as applied to a hub, 21, having its fixed or integral flange, 22, at the outer side and the slip flange, 23, at the inner side; frequently this slip flange, 23, is simply the web of the brake drum if the hub is a rear wheel hub. This construction brings the fillet, 24, nearer the outer end of the hub and adjacent the flange, 22, and therefore in this case the inner annular portion, 25, and outer annular portion, 26, of the mounting member, 20, are shown as in substantially the same plane adjacent the inner flange, 23, of the hub. Projecting outwardly from the plane of these portions of the member, is an annular flange, 27, more fully shown in Fig. 5, and serving as a seat for the flange, 6, of the wheel disk, 2. The disk is removably attached to the outer annular portion, 26, by threaded studs, 16, provided with nuts, 17, and lock washers, 18, as in the form shown in Fig. 2. The inner annular portion, 25, is bored to fit snugly on the cylindrical part of the hub, 21, and thus transmit the load from the hub to the wheel. At intervals within the flange, 27, there are formed spacing lugs or bosses, 28, apertured at 29 with clearance for the clamping bolts, 15, by which the mounting member, 20, is secured between the flanges, 22 and 23, and which may be relied upon for transmission of torque if the frictional engagement of said flanges with the mounting member, 20, should prove insufficient for this purpose.

Fig. 6 shows a further modification in which the mounting member is quite similar to the member, 10, shown in Fig. 2, but is applied to a hub, 21, similar to that shown in Fig. 4. Therefore to avoid engagement with the fillet, 24, adjacent the outer flange, 22, of this hub, the inner annular portion, 31, is formed with a central aperture considerably larger than the cylindrical part of the hub, 21, and the filler ring, 32, relied upon for centrally seating the mounting member upon the hub itself. The slip flange, 23, is clearly indicated as the web of the brake drum, 33, and the outer annular portion, 34, of the mounting member extends in contact therewith.

The three forms of mounting member illustrated serve to indicate that merely by changing the specific design of the mounting member a wheel of this type can be readily adapted to various designs of hub so as to replace the original wooden spokes without the necessity of any alteration in the hubs themselves or in the disk and rim portions of the wheel. For a given external diameter, the disk 2, need only be made in one form and always with the same size opening within its flange, 6; the flange or shoulder of the mounting member will in every case fit snugly within the flange, 6, of the disk, 2, while in other respects the mounting member will be designed to accommodate itself to the particular hub for which it is intended. It is thus in the nature of an adapter for fitting the disk wheel to various styles of hubs.

As a modification of the rim design, Fig. 7 presents a two-part rim in which the portion, 40, is provided with a single lateral tire-retaining flange, 41, while the other tire-retaining flange, 42, is formed on a separate element of annular form having a portion, 43, which extends obliquely from the retaining flange, 41, into contact with the web, 2, of the wheel. Said web is shaped substantially as shown in Fig. 2 with a flange, 44, permanently secured to the rim member, 40, but in the angle between the flange, 44, and the annular portion, 45, of the web there is welded or otherwise secured a block, 46, bored and threaded to receive a clamp screw, 47, extending through an aperture in the oblique portion, 43, of the rim member. By providing a plurality of such screws, 47, and either a plurality of blocks, 46, or forming such blocks in a continuous ring suitably secured in the angle of the disk and its flange, 44, the separable rim member can be drawn into place or readily removed to permit removal of a tire. The oblique arrangement of the annular part, 43, serves to stiffen the connection between the rim and the disk and gives the disk a broader footing on the rim.

As suggested in Fig. 2 when the spacing member is in the form of a wooden ring, 14, it may be made slightly larger than the adjacent hub flange so as to leave exposed at the inner side of the wheel an area of wood sufficient for insertion of screws to hold the speedometer driving gear shown in dotted lines at 50. Such screws are indicated at 51 and will thus engage the member, 14, in the same manner as they formerly engaged the original spokes of the wheel.

Fig. 8 shows a construction very similar to that of Fig. 2 but in this instance the outer flange is entirely dispensed with since the inner annular portion, 60, of the mounting member will serve all the requirements. Obviously it may be desirable to make the filler ring, 62, slightly thicker than the ring, 14, so that the parts will occupy substantially the same portion of the hub, 9, as the original spokes and flange. This will slightly increase the width of the flange portion as shown at 61, but otherwise the structure will be exactly similar to that of Fig. 2, and corresponding references are applied to it in Fig. 8.

Fig. 9 shows a further modification in which the outer annular portion of the mounting member is dispensed with entirely and the disk, 2ˣ, is shown as fastened to the mounting member by studs, 64, secured in the annular part, 63, and passing through a transaxial flange, 65, extending from the seating flange, 66, of the disk. As in the other forms, the flange, 66, seats snugly over the flange, 67, of the mounting member, and said mounting member is apertured at the center to fit snugly on the cylindrical part of the hub, 9, being secured in position by bolts, 68, passing through a filler ring, 62, and the hub flange, 7.

I claim:—

1. In a vehicle wheel, in combination with a hub having a pair of flanges adapted to coöperate as clamping means, an annular mounting member having its inner circumferential margin clamped between said flanges, and formed with an annular shoulder slightly greater in diameter than the outer of said flanges; an annular disk having at its outer circumference an annular laterally-projecting flange for seating the tire-carrying rim, said disk seating at its inner circumference upon said shoulder of the mounting member, and secured to said mounting member proximate to said seat.

2. In a vehicle wheel, in combination with a hub having a pair of flanges adapted to coöperate as clamping means, an annular mounting member having its inner circumferential margin clamped between said flanges and formed with an annular shoulder slightly greater in diameter than the outer of said flanges; an annular disk adapted to be secured at its outer circumference to a tire-seating rim, and having at its inner circumference a laterally-projecting flange, dimensioned to fit snugly upon the shoulder of the mounting member, and secured to said mounting member proximate to said seat.

3. In the construction defined in claim 2 foregoing, a disk having at its outer circumference a laterally projecting flange for seating the tire-holding rim, said flange being projected from the disk in the opposite direction from the flange at the inner circumference, whereby said disk is rendered Z-shaped in radial section.

4. In the construction defined in claim 2, foregoing, the disk having at its outer circumference a flange projecting laterally in the direction opposite to the projection of the flange at its inner circumference, for affording a seat for the tire-carrying rim at the outer circumference of said disk, the two flanges of said disk at its inner and outer circumferences respectively, being both contained btween the two planes transverse to the axis of the wheel which are spaced apart by the width of the wider of said flanges; whereby said disk is dished between its two flanges for transmitting the radial stress of the load.

5. In the construction defined in claim 2 foregoing, the mounting member being extended in the plane of rotation radially outward from the shoulder mentioned for lapping the inner circumferential margin of the disk, and the securement of the disk to the mounting member being at such lapped portion.

6. In a vehicle wheel in combination with a hub having a pair of flanges adapted to coöperate as clamping means; a mounting member in the form of a sheet metal ring having inner and outer annular portions respectively offset from each other forming an intervening shoulder; an annular disk dimensioned as to its central aperture for seating snugly upon said shoulder of the mounting disk, and adapted at its outer circumference for securement to a tire-carrying rim, and an annular spacing member which fits snugly within the portion of the mounting member which forms said shoulder and against the inner annular portion of said mounting member; said inner annular portion and the spacing member being clamped between the flanges of the hub.

7. In the construction defined in claim 6 foregoing, the spacing member being of greater diameter than the hub flange which engages it directly, as and for the purpose specified.

8. A disk wheel for vehicles comprising an annular rim member and a peripherally flanged disk initially formed with a flange flaring more widely than could be accommodated within the rim, said disk being forced into the rim and its flange secured permanently thereto.

9. In the combination defined in claim 8 the said disk being of dished formation before its assembly with the rim.

In testimony whereof, I have hereunto set my hand at Chicago, Illinois, this 1st day of November, A. D., 1919.

THOMAS I. DUFFY.